United States Patent [19]
Kikuchi et al.

[11] Patent Number: 5,863,601
[45] Date of Patent: Jan. 26, 1999

[54] PROCESS OF PRODUCING GRAPHITE FIBER

[75] Inventors: Rie Kikuchi, Yamato; Masako Yudasaka, Kawasaki; Yoshimasa Ohki, Sagamihara, all of Japan

[73] Assignee: Research Development Corporation of Japan, Kawaguchi, Japan

[21] Appl. No.: 679,383

[22] Filed: Jul. 9, 1996

[30] Foreign Application Priority Data

Jul. 10, 1995 [JP] Japan .................................. 7-210161
Feb. 15, 1996 [JP] Japan .................................. 8-028087

[51] Int. Cl.$^6$ .................................................. C23C 16/26
[52] U.S. Cl. ..................... 427/200; 427/206; 427/249; 427/301; 427/259; 427/282; 423/447.5; 423/448
[58] Field of Search ..................... 427/249, 577, 427/590, 255, 301, 259, 282, 200, 206; 423/447.5, 448

[56] References Cited

U.S. PATENT DOCUMENTS 4,572,813 2/1986 Arakawa ................................ 264/29.2
4,816,289 3/1989 Kamatsu et al. ..................... 423/447.3
4,855,091 8/1989 Geus et al. ................................. 264/22

FOREIGN PATENT DOCUMENTS 68110493 7/1983 Japan .
61-225319 10/1986 Japan .

*Primary Examiner*—Shrive Beck
*Assistant Examiner*—Timothy Mecks
*Attorney, Agent, or Firm*—Sherman and Shalloway

[57] ABSTRACT

A process of producing graphite fiber which includes the generation of the fiber by chemical vapor deposition using an organo metal compound which includes a metal catalyst and the use of a less reactive substance as a substrate to adhere carbon or metal at specific positions on the substrate. And a process of producing graphite fibers by chemical vapor deposition of fine particles of nickel, iron or cobalt as catalyst and use of an organic compound as a source of carbon which includes generating the fibers at a temperature between 650° C. and 800° C.

15 Claims, 5 Drawing Sheets

PROCESS OF PRODUCING GRAPHITE FIBER

BACKGROUND OF THE INVENTION

1. Field of the Invention

This invention relates to a process of producing fine graphic fiber and particularly to a process of selectively generating graphite fiber at a desired position on a substrate.

2. Disclosure of the Prior Art

Very fine cylindrical graphite fiber having around a $10^{-9}$ m diameter which is generally called carbon nano-tube, is characterized having a feature of wound sheets of graphite nets like a concentric column. Therefore, regarding a feature of electric conductivity, the graphite fiber is predicted to have a broadly extended feature from that of metal to that of semiconductor which is originated in the minute structural difference of it, and accordingly, the newly developed applications are expected.

The following two described techniques are known conventional methods for producing graphite fiber. That is, a process of heat treating with high temperature the fibrous product prepared by spinning an organic compound, and a process of growing fibrous product by chemical vapor deposition using an iron catalyst. Further, recently, a process of generating fibers by arc discharge using carbon electrode has been reported. However, in the heat treating method of spun organic compound fibers it is difficult to control the structure of carbon material and it is therefore difficult to obtain a product having good crystallization. On the other hand, referring to the process which uses iron catalyst, it is reported that a fiber having a structure in which the surface of graphite crystal is wound to form a concentric column can be obtained.

Consequently, among the conventional processes for producing graphite fiber, a process using iron catalyst and a process using arc discharge can be selected to produce the so called graphite nano-tube having the structure feature of wound sheets of graphite crystal nets like a concentric column. The process using iron catalyst is explained as follows. An organo metal compound starting material vapor which includes iron, e.g. ferrocene (dicyclopentadienyl iron) is used as the starting material to generate fine iron particles by chemical vapor deposition and produce the graphite fiber by using the iron particles as a catalyst in a reaction vessel. This process must be carried out in the temperature of higher than 1000° C. to generate graphite fibers. The graphite fibers are generated at any location and on any wall surface of the reaction vessel. It is difficult to limit the location on which graphite fiber is generated to any specified location in the reactor. In the case of the process using arc discharge method, graphite fiber is generated on cathode alone like a lump. It is necessary to use a special apparatus for arc discharge, and even using the arc discharge process, it is difficult to generate fiber on a desired position.

OBJECT OF THE INVENTION

The inventors have conducted intensive study to generate graphite fiber on a desired position, and consequently, accompanied the present invention. Namely, the object of this invention is to provide a process of producing graphite fibers at a desired position on a substrate with more than a submicron size accuracy.

SUMMARY OF THE INVENTION

This invention is based on the process of producing graphite fiber by means of chemical vapor deposition, and the important point of this invention is the use of a less reactive substance as a substrate and to previously adhere a small amount of carbon or metal at the position on the substrate where it is desired to generate graphite fibers.

As above mentioned, a small amount of carbon or metal is previously provided, i.e., adhered to a part of the surface of a less reactive substrate, then a chemical vapor deposition method is used, and the generation of graphite fiber can be observed selectively at the area on which carbon or metal is previously provided. On the other hand, nothing is generated on the substrate surface that does not contain carbon or metal. Thus, by the present invention, it is easy to generate the graphite fiber at the desired area of the substrate. Further, the following method also can be mentioned as an application of this invention. For example, a surface of carbon or metal is coated by a thin film of a less reactive material and the film is partially removed to expose the base layer of carbon or metal then the graphite fiber can be generated only at the exposed portion of carbon or metal. And if the substance of base layer is an electric conductive one, the generated graphite fiber can be said to be electrically connected.

BRIEF ILLUSTRATION OF THE DRAWING

FIG. 1. Schematic illustration of the process of producing graphite fibers of this invention.

FIG. 2. Sectional view of apparatus for producing carbon nano-tube of this invention used in Example 1 and Example 4.

FIG. 3. Raman scattering spectrum of substance obtained by Example 1 of this invention.

FIG. 4. SEM picture of carbon nano-tube obtained by Example 1 of this invention.

FIG. 5. Sectional view of apparatus for producing carbon nano-tube of this invention used in Example 2 and Example 5.

FIG. 6. Schematic illustration showing the construction of substrate used in Example 9 of this invention (a), and showing the generation of graphite fiber on said substrate (b).

FIG. 7. Schematic illustration showing the construction of substrate used in Example 10 of this invention (a), and showing the generation of graphite fiber on said substrate (b).

DETAILED DESCRIPTION OF THE INVENTION

Figure 1A:
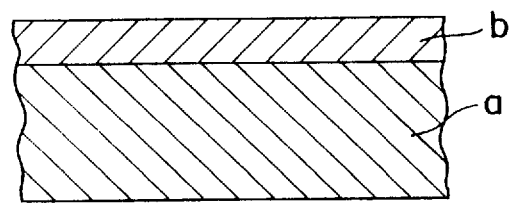

The present invention is disclosed in detail as follows.

With respect to the present invention, the process of producing graphite fiber by using the chemical vapor deposition (hereafter CVD) method refers to the thermal decomposition-polymerization reaction of vaporized starting materials, i.e., organic compounds and organic metal compounds, and generates graphic fiber on the substrate by said reaction. Cobalt, nickel, iron and their alloys are used as metal which acts as the catalyst. In this invention, the following compounds can be used as the starting material. That is, an organic compound having an adequate vapor pressure for CVD, or an organo metal compound including the previously mentioned metals which act as catalyst can be used. Concretely, organic compounds, not including metal, such as orthomethyldiallylketones or their derivatives, phthalocyanine compounds and metallocene compounds which includes metal catalyst can be preferably mentioned. However, the scope of this invention is not intended to be limited to them. The said less reactive material which can be used as the substrate in this invention is a material which does not participate in the CVD reaction of this invention and also does not react with metal at the reaction temperature, e.g., non-reactive materials such as quartz, alumina, oxidized silicon, or the like can be used as the substrate. And on the surface of said substrate carbon or metal is adhered, then the graphite fiber is selectively generated at the point at which the carbon or metal is adhered. In the expression of "carbon or metal" of this invention, the term of "metal" indicates a transition metal and preferably indicates a metal of iron or platinum family, and concretely cobalt, platinum or the like can be mentioned. It is not necessary that the metal included as a component in the starting material organic metal compound be the same as the metal adhered to the surface of substrate.

In this invention, the graphite fiber is produced on the portion of the substrate on which carbon or metal is adhered by using vacuum evaporation or CVD method. The heat treatment temperature depends on the vapor pressure of the starting material, for instance is about from 50° C. to 400° C. And, the substrate must be heated, but the necessary temperature depends on the kind of starting material used and generally is concentrated about within the range from 600° C. to 1000° C. Especially preferred is a temperature within the range from 700° C. to 850° C. Desirable the atmosphere of the reactor is that of an inert gas, e.g. argon, nitrogen or the like and at a pressure of under 1 atm. or the less, or in a vacuum.

At the surface area of substrate on which the generation of graphite fiber is intended, carbon or metal is previously adhered. As methods for adhering the carbon or metal, the following methods are mentioned. After preparing a layer of photo resist resin on the substrate surface, a pattern is written on the surface by a photo-lithographical technique, then heated and carbonized and carbon is adhered on selected portions of the surface of substrate. Or, a metal layer is vapor deposited on the substrate surface and the obtained metal layer is processed to form a pattern of lines narrower than 1 μm width, or a dotted pattern or other desired pattern by photo-lithographical technique. In the case of the metal thin layer, there is no limitation on thickness, however, in the case of carbon thin layer, the desirable thickness is thinner than 50 nm. If the pattern is like a particle, in the case of carbon, the size is desirably smaller than 50 nm in diameter.

Further, the following preparation method of the substrate can be mentioned. The thin layer of carbon or metal and a thin layer of a less reactive material is stacked mutually. And a part of outer surface layer made of the less reactive material is removed so as to partially expose the layer of carbon or metal. By using said substrate having stacked layer the following effect can be expected. That is, if the applied carbon or metal has electrical conductivity, since the graphite fiber is generated at the inner layer of carbon or metal, the generated graphite fiber is electrically connected.

In this invention, the case which uses nickel metal as the catalyst is disclosed in detail below. The use of fine particles of nickel as the metal catalyst, promises the possibility of producing graphite fiber without using organic metal compound as the starting materials and by mild reacting condition of 650° C. to 800° C.

The important point of this invention is explained as follows. That is, in this invention, the process of producing graphite fibers is composed by using fine particles of nickel as a catalyst, using organic metal compound as a starting material and producing graphite fibers by means of CVD method, characterized by generating graphite fibers on fine particles of nickel within the range of temperature between 650° C. and 800° C. And, as the fine particles of nickel catalyst, it is desirable to use the fine particles of nickel which is prepared in vacuum or in non-oxidation atmosphere by heat treating a thin film of nickel formed on the surface of a substrate and by coalesing and granulating it on the substrate. And to carry out easily the coalescence and granulation of nickel, it is desirable to use a less nickel adhesive material as the substrate.

Namely, in this invention, fine particles of nickel metal are used as the catalyst for producing graphite fibers, and the fine particles of nickel metal are used by being dispersed on the surface of substrate.

Furthermore, when the organo metal compounds are used as the starting material, it is possible to produce the fibers which involve large amount of metal.

Figure 1B:
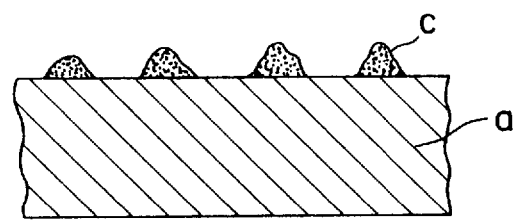
Figure 1C:
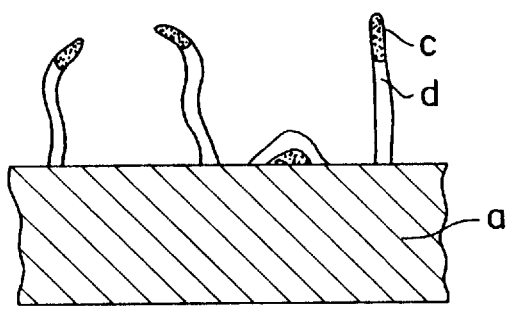

The process of producing graphite fiber of this invention is schematically illustrated with the accompanying drawing. In FIG. 1(a), (i) nickel evaporated film "b" is prepared on the surface of substrate "a", (ii) then is heated at the temperature of around 700° C. Since nickel is less adhesive with the substrate, the nickel evaporated film "b" is scattered, as shown in FIG. 1(b), as nickel fine particles "c" on the substrate. The said fine particles of nickel "c" scattered on the substrate are used as the catalyst, and, as shown in FIG. 1(c), (iii) crystals of graphite are generated by means of CVD method. The crystals of graphite generated at the nickel fine particles "c" scattered position and the graphite fibers are produced. Consequently, in this invention, it is possible to produce the graphite fiber at desirable position by the selective positioning of the nickel metal fine particles on the surface of substrate.

In this invention, it is necessary to disperse the nickel metal fine particles. To disperse the nickel metal fine particles, the material which is less adhesive with nickel metal is preferred as the substrate and nickel film is prepared on the surface of said substrate. Since the condensing force of nickel itself is stronger than the adhesive force of nickel with the substrate, when it is heat treated nickel is granulated and dispersed over the surface of substrate. In this invention, it is desirable to use above mentioned nickel metal fine particles. As the substrate which has above mentioned feature, e.g. an oxide such as quartz glass or fluoride such as calcium fluoride can be mentioned.

In this invention, the said substrate is used, as the nickel evaporated film is prepared over the surface of the substrate, and the nickel metal fine particles are dispersed on the substrate. If the thickness of evaporated film is too thick, nickel is not granulated by the heat treatment and maintain the state of continuous film. Therefore, the thickness of nickel evaporated film is preferably between 1 and 20 nm, and more suitably is about 5 nm. By heat treating the evaporated nickel thin film having said thickness for about 30–200 minutes at the temperature of between 650° C. and 800° C. in vacuum or non-oxidation atmosphere, fine particles of nickel having diameter of around 200 nm which are scattered on the surface of the substrate are obtained.

In this invention, any kind of organic compound can be used as the source material of carbon. However, the following organic compound is illustrated as a preferable compound for the source material. That is, for instance aromatic ketone compound having a substituted group at ortho position of one aromatic ring disclosed in the specification of "Producing method of graphite thin film" (Japanese patent application 93/64946, filed on Mar. 24, 1993, invented by the inventors) can be preferably mentioned. The said organic compound is concretely indicated by following formulas.

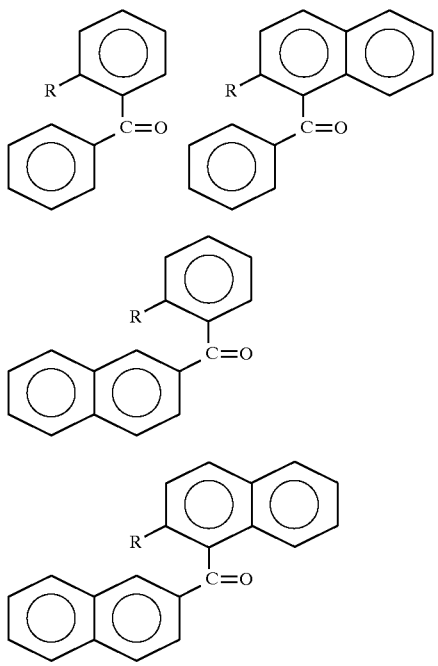

(herein R indicates alkyl group)

When said aromatic ketone compound having a substituted group at ortho position is used, the adequate region of the temperature to generate graphite fibers on a substrate is preferably between 650° C. and 800° C. Since this temperature is almost the same as the temperature that the nickel evaporated film on the substrate is granulated, an apparatus and an operating method of this invention can be simplified. When the starting material for CVD method is thermally decomposed at the said temperature, graphite fibers are generated at the existing position of nickel on the surface of substrate. Nickel thin film which exists on unnecessary position of substrate is predictively removed by using acid. And then by heat-treating it with adequate temperature, fine particles of nickel metal scattered are scattered only on the necessary position of the substrate, and consequently graphite fiber generates at the position.

According to the above mentioned process of this invention, it becomes possible to control the diameter of the particle of nickel metal by adjusting the thickness of evaporated nickel film. Particle size of the nickel metal catalyst is the most important value for the generation of graphite fibers. Further, by using the fine particles of nickel as the catalyst the reacting temperature for generation of graphite fibers can be dropped to the low temperature between 650° C. and 800° C. And simultaneously, since this temperature almost agrees with the temperature that the nickel evaporated film on substrate is granulated, an apparatus and an operating method of this invention can be simplified. By using a thin nickel film, it is possible to generate graphite fibers only on the desired position of substrate, by removing the thin nickel film existing on the undesired positions of the substrate while leaving thin nickel film on the desired positions, for instance by means of a photolithographic method. Otherwise, the method to remove fine particles existing on undesired position after nickel metal is granulated can be easily carried out.

By using carbon as a catalyst instead of metal, and by using an organic metal compound in which the element of catalyst is included in the starting material, it is possible to generate the fibers selectively. The generated fiber obtained by using an organo metal compound starting material includes many fine particles of the metal in the center of the generated fiber.

The present invention will be understood more readily with reference to the following examples and to the accompanying drawings.

EXAMPLE 1

Figure 2:
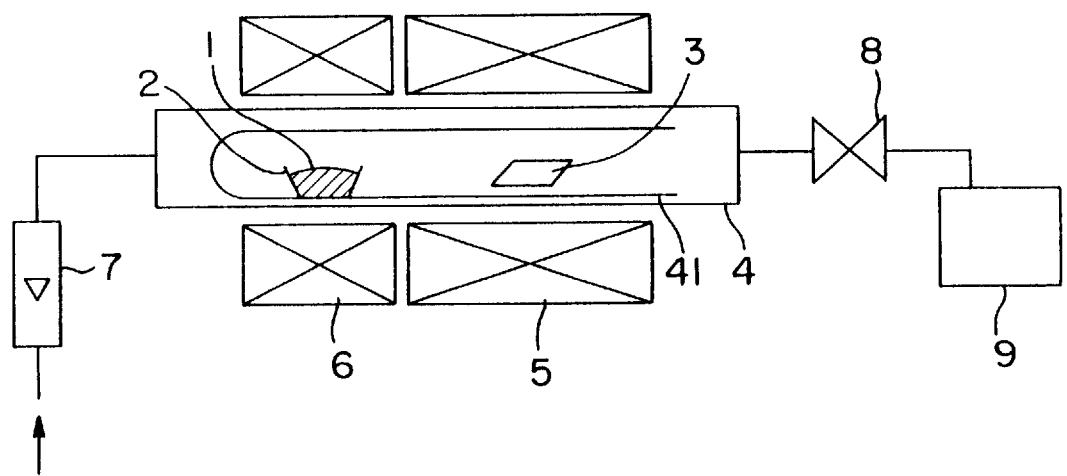

FIG. 2 is a schematic view of an apparatus for producing graphite fiber of EXAMPLE 1 of this invention. In FIG. 2, a liner tube 41 is arranged in a reaction tube 4 made of quartz to prevent the sticking of precipitated material generated by reaction on the inner surface of the reaction tube. Said liner tube 41 must be changed to a clean one after every reaction. Starting material 1 for CVD method is inserted into container 2 and set into liner tube, and the amount of vaporization is controlled by the temperature of the electric furnace 6. The temperature of substrate 3 set in the liner tube 41 is controlled by the electric furnace 5.

In this EXAMPLE, 2-methyl 1,2 '-naphthylketone indicated by the following formula is used as the starting material.

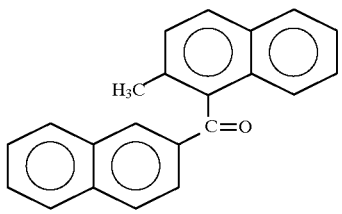

Figure 3:
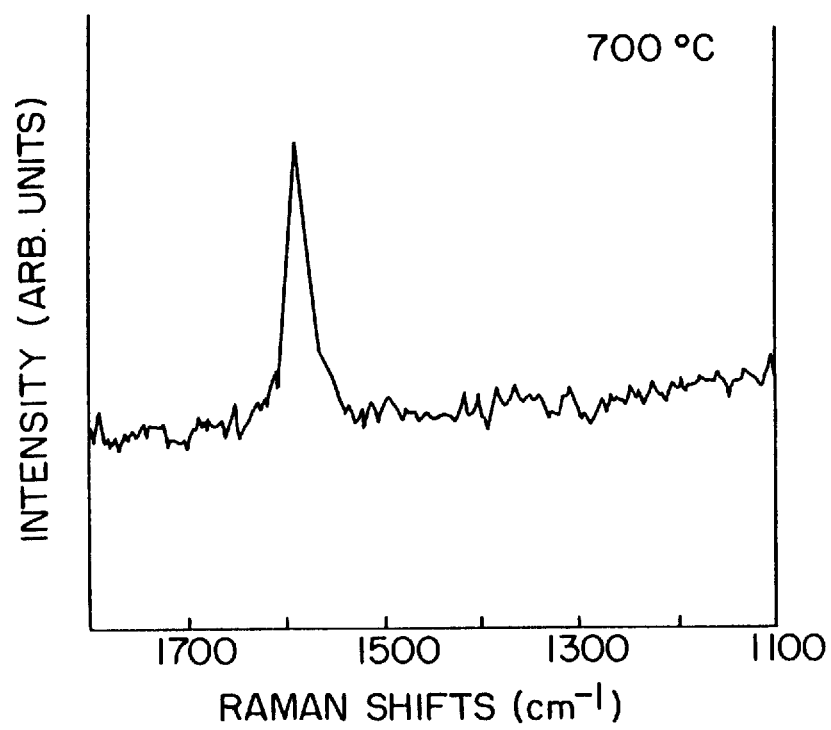
Figure 4:
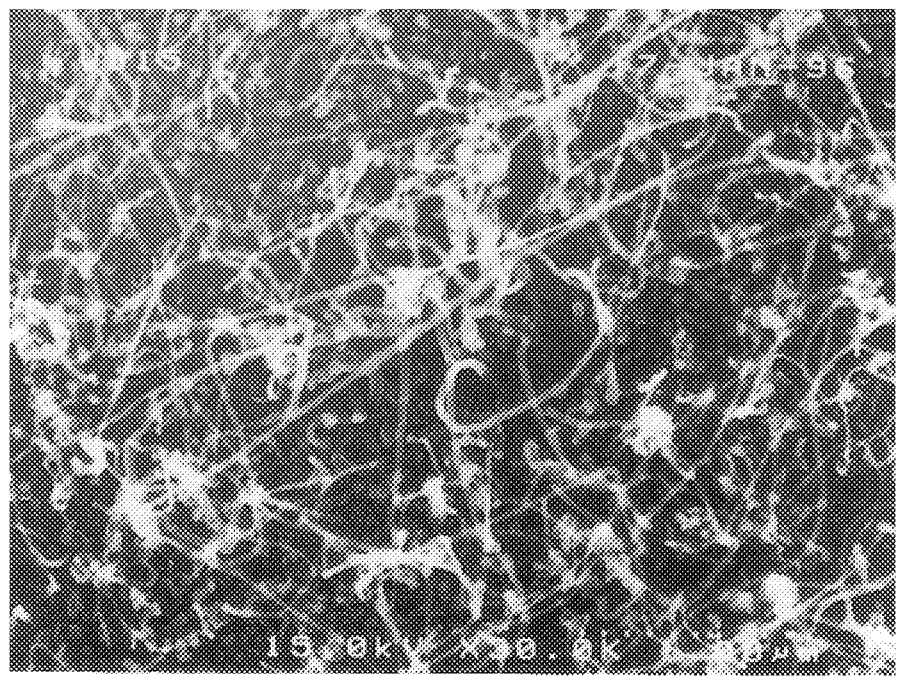

The substrate 3 used in this Example is quartz glass, and a nickel evaporated film of 5 nm thickness is prepared on it. Highly purified argon gas can be supplied to the reacting tube through flow controller 7. To the evacuating side of the reacting tube an evacuate equipment 9 is installed through a valve 8 so as to control the pressure in the reaction tube 4. The temperature of the container 2 in which the starting material is placed is fixed at 100° C. Said temperature is fixed for the purpose to evaporate the starting material at adequate pressure. And the temperature of the part in which the substrate 3 is placed is fixed at 700° C. The nickel evaporated film on the surface of substrate 3 can be granulated at said temperature. Highly purified argon gas is supplied by flow rate of 300 cc/minutes and reacted for 3 hours at 1 atom. After the reaction, the generation of graphite fiber involving fine particles of nickel can be observed. The obtained specimen is measured by Raman scattering spectrum. According to the resulting chart of spectrum shown in FIG. 3, the obtained spectrum has an unique feature of crystalline graphite, and the generation of graphite substance is confirmed. Further, by the Scanning Electron Microscope (SEM) observation, the generation of many fibrous substance is confirmed. The fibrous substance is observed by Transmission Electron Microscope (TEM), it is understood that each fiber is hollow, partially involves fine particles of nickel and has a structure of winding like as a concentric column. Said structure is called as carbon nano-tube. So, hereafter the term of carbon nano-tube is used in this invention.

The reason why above mentioned reaction is occurred is investigated by the inventors, and it becomes clear that the evaporated nickel film is concentrated like small islands during the interval of temperature rising to the reacting temperature, and the concentrated fine particles of nickel become the catalyst of carbon nano-tube generation.

The temperature of the substrate arranged place, that is, the reaction temperature is varied from 300° C. to 1000° C. and the generation of carbon nano-tube is observed. It is found out that the adequate temperature for the generation of carbon nano-tube is within the range between 650° C. to 800° C.

The experiments to reduce the pressure of the reaction tube to a level lower than 1 atm. are carried out, and it is recognized that the carbon nano-tube can be generated at the pressure of 0.01 atm. as well as 1 atm. condition.

EXAMPLE 2

Example 2 is concretely illustrated with reference to FIG. 5.

Figure 5:
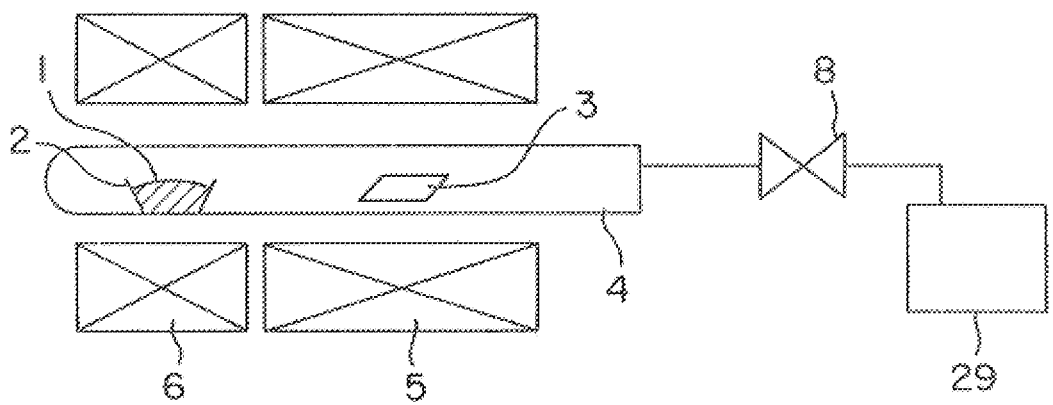

FIG. 5 is a schematic view of an apparatus used in Example 2. Quartz reaction tube 4 can be evacuated to the pressure level of $10^{-6}$ Pa by using evacuate line 29 with turbo molecular pump. Starting material 1 and substrate 3 is set in this quartz reaction tube 4. The same starting material and substrate that were used in Example 1 are used. After the starting material and the substrate 3 are set, the inside of reaction tube 4 is evacuated to $10^{-5}$ Pa by using evacuate line 29. Then, while continuously evacuating, the temperature of substrate 3 is increased to 700° C. and the temperature of the starting material is increased to 100° C. The starting material is evaporated and reacted on substrate 3. The reaction product is precipitated at the low temperature part of the reaction tube 4. The color of precipitated product is white or light yellow. After the reaction, the temperature of electric furnace is cooled down and the substrate is checked. In the same manner as in Example 1, the generation of carbon nano-tube is confirmed. The temperature of the place where the substrate is set, namely the reaction temperature is varied from 300° C. to 1000° C., and it is found that an adequate temperature to generate carbon nano-tube is within the range between 650° C. and 800° C. The starting material 1 and substrate 3 can be heated to the intended temperature by using electric furnace in the same manner as used in Example 1.

EXAMPLE 3

Same apparatus as used in Example 2 is used except using a substrate having patterned nickel evaporated thin film on the surface. That is, nickel thin film of 5 nm is precipitated on the surface of quartz by means of vacuum evaporating method. This nickel thin film is processed to have striped pattern by using photo-lithographical technique. Said substrate is used, and the reaction is carried out according to the same condition and procedure used in Example 2. Carbon nano-tube is generated only at the area where the stripe patterned nickel thin film remained, and nothing is generated at the area where the quartz is exposed.

EXAMPLE 4

The process of producing graphite fiber is illustrated with reference to the above mentioned FIG. 2. In FIG. 2, the reaction tube 4 is made of quartz, and liner tube 41 is arranged in the reaction tube 4 to prevent the sticking of precipitated substance generated by the reaction. Liner tube 41 is changed to a clean one after each reaction. Starting material 1 for CVD method is inserted into container 2, and placed in liner tube 41.

In this Example, phthalocyaninecobalt is used as the starting material.

Reaction tube 4 is heated by electric furnace 6, and the vapor pressure of the starting material 1 is controlled by electric furnace 5. The substrate 3 used in this Example is a quartz glass substrate on which 5 nm of nickel thin film is prepared and a striped pattern narrower than 1 μm width is formed by photo-lithographical technique. In the reaction tube 4, a highly purified argon gas is supplied through flow controller 7. To the evacuate side of reacting tube 4, the evacuating equipment 9 is installed through a valve 8 so as to control the pressure of reaction tube 4. The temperature of the portion where starting material 1 is placed is set up to 380° C. The temperature is set to evaporate the raw material 1 at an adequate vapor pressure. The temperature of the part where the substrate is placed is set at 850° C. Highly purified argon gas is supplied to the reaction tube at the flow rate of 300 cc/minute and the reaction is carried out for 1 hour at 1 atm. After the reaction, a specimen of the reaction product is inspected by microscope and the generation of graphite fiber having a diameter smaller than 1 μm and a length longer than 50 μm is observed along the strips of nickel. On the other hand, nothing is precipitated on the surface of exposed quartz.

Cobalt, iron and platinum are tested as the metal to form previously a pattern on quartz substrate and it is recognized that these metals are useful for the generation of graphite fibers. These fibers are investigated by a transmission electron microscope, and it is recognized that the graphite surface layer is wound like a concentric column and has a hollow structure involving partially fine particles of cobalt.

The temperature of the place where the substrate is set, namely the reaction temperature is varied from 300° C. to 1000° C., and then the generation of carbon fiber nano-tube is investigated. The result shows that when the raw material is phthalocyaninecobalt an adequate generating temperature of carbon fiber nano-tube is higher than 700° C., desirably is higher than 800° C.

The experiments to reduce the pressure of reacting tube to a level lower than 1 atm. are carried out, and it is recognized that the carbon fiber nano-tube can be generated at the pressure of 0.01 atm. as well as the condition of 1 atm.

EXAMPLE 5

The apparatus shown in FIG. 5 is used. In FIG. 5, a quartz reaction tube 24 can be evacuated to the pressure of $10^{-6}$ Pa by using the evacuate line 29 in which a turbo molecular pump is installed. Starting material 1 and substrate 3 is set in this quartz reaction tube. The same starting material and substrate as used in Example 1 is used. After starting material 1 and substrate 3 are set, the inside of the reaction tube is evacuated to $10^{-5}$ Pa by using evacuate line 29. While continuously evacuating, the temperature of substrate 3 is increased to 850° C. and the temperature of the starting material is increased to 380° C. The starting material is evaporated and reacted on substrate 3. A reaction product is precipitated at the low temperature part of the reaction tube. The color of precipitated product is blue. The reaction time is set at 1 hour. After the reaction, the temperature of the electric furnace is cooled down and the substrate is investigated. In the same manner as in Example 4, the generation of carbon fiber nano-tube is confirmed. The temperature of the place where the substrate is set, namely the reacting temperature is varied from 300° C. to 1000° C., and it is found out that the generating temperature of graphite fiber is higher than 700° C. when phthalocyaninecobalt is used as the raw material. In the case of phthalocyaninenickel, graphite fiber is generated at the temperature of higher than 650° C.

EXAMPLE 6

Experiments using the same condition as in the Example 5 are carried out, except using a plate of alumina as a substrate instead of quartz. The generation of graphite fiber is observed at the striped pattern of metal as in Example 5.

EXAMPLE 7

Experiments using same condition as in Example 5 are carried out, except a dotted pattern is formed on the substrate instead of forming a striped pattern. By controlling the time for etching, patterns having from 2 $\mu$m to 1 nm size can be formed. Those patterns can be understood to have a characteristic of fine particles. Substrates having those patterns are used for the experiments to generate graphite fiber. On the bigger pattern, the generation of plural graphite fibers are observed, however, on the small pattern a single fiber is generated. And by this phenomenon, it is recognized that the pattern on quartz gives an opportunity for the generation of fiber.

EXAMPLE 8

Quartz is used as a substrate, and photo resist resin (AZ-1400) of 0.2 $\mu$m thickness is coated on the substrate, then the pattern of 1 $\mu$m width is formed by using photo-lithographical technique. This resist pattern on quartz is heated and carbonized in argon gas flow at 700° C., and experiments to generate graphite fiber are carried out. And the generation of fiber is observed only on the carbonized resist. However, it is found that a too thick resist layer prevents the growth of fiber. For the generation of good fiber it is preferably that the fiber generation be performed on a resist of a thickness thinner than 1 nm. Fibers do not generate on the area where quartz is exposed.

EXAMPLE 9

As another example of this invention, a substrate of a different construction is used.

Figure 6A:
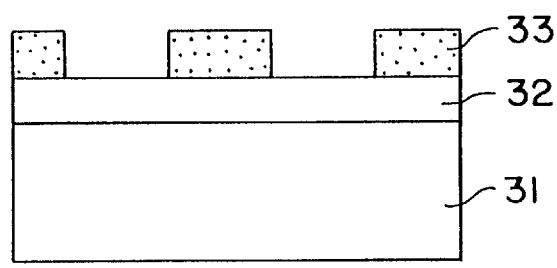
Figure 6B:
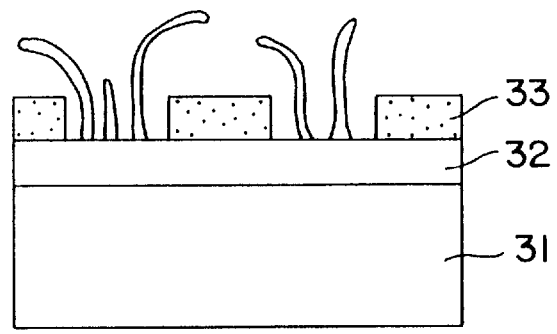

FIG. 6($a$) is a cross-sectional view illustrating the construction of substrate used in this Example. Cobalt metal layer 32 of 250 nm thickness is evaporated on a quartz plate 31, and on the said metal layer 32 a quartz layer 33 of 8 nm is formed by using plasma CVD method. Quartz layer 33 is partially removed by photo-lithographical technique, and the inner cobalt layer 32 is exposed.

Using said substrate, experiments are carried out using the same process as in Example 5, and the generation of graphite fiber is observed on the exposed portion of the cobalt surface 32. However, on the surface of quartz layer, nothing is generated. This generation of graphite fiber is schematically illustrated in FIG. 6($b$).

EXAMPLE 10

Figure 7A:
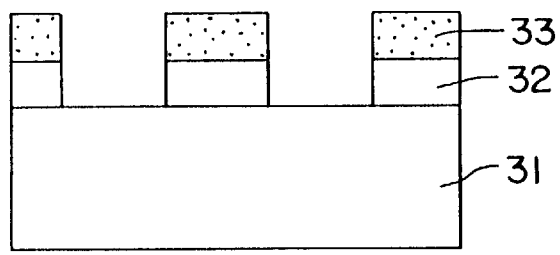
Figure 7B:
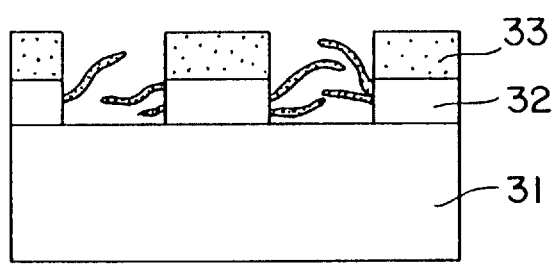

FIG. 7 is a illustration of the construction of another substrate. In FIG. 7, metal cobalt layer 32 of 250 nm thickness is evaporated on quartz plate 31, and on the metal cobalt layer a quartz layer 33 of 80 nm thickness is formed by plasma CVD technique. The quartz layer 33 and the cobalt layer 32 are partially removed by photo-lithographical technique, and the bottom quartz plate 31 surface is exposed. That is, the metal 32 is exposed at the section of layer 32 between quartz layers 31 and 33.

Using said substrate, experiments are carried out using the same process as in Example 5, and the generation of graphite fiber is observed on the exposed cobalt thin surface 32 between the quartz layers 31 and 33. However, on the surfaces of the quartz layers 31 and 32, nothing is generated. This generation of graphite fiber is schematically illustrated in FIG. 7($b$).

As above mentioned, this invention provides the process of producing graphite fiber at specifically defined desired locations, and by this process it is possible to accurately control the position where fibers are generated by submicron size precision.

What is claim is:

1. A process for producing graphite fibers which comprises adhering metal or carbon catalyst at desired positions on a substrate, which process comprises depositing a metal catalyst layer or carbon catalyst layer on said substrate, forming a reduced surface area of said metal catalyst layer or said carbon catalyst layer on said substrate by selectively covering a portion of the metal or carbon catalyst layer with a layer of material or by selectively removing a portion of the metal or carbon catalyst layer from the substrate, which reduced area defines areas on which it is desired to generate graphite fibers, and generating graphite fibers on said desired positions by chemical vapor deposition from an organo metal compound or an organic compound on the metal catalyst, or generating graphite fibers on said desired positions by chemical vapor deposition from an organo metal compound on said carbon catalyst.

2. A process for producing graphite fibers which comprises adhering a metal catalyst on a substrate which process comprises depositing a layer of metal catalyst on said substrate, forming a reduced surface area of said metal catalyst layer on said substrate by selectively covering a portion of the catalyst layer with a layer of material or by selectively removing a portion of the catalyst layer from the substrate, which reduced area defines positions on the substrate on which it is desired to generate graphite fibers, and generating fibers at said desired positions by chemical vapor deposition of carbon from an organic compound or an organo metal compound at a temperature of 650° to 850° C. on to said metal catalyst.

3. The process of claim 2 for producing graphite fibers wherein the metal catalyst layer is 1 to 20 nm thick.

4. The process of claim 2 for producing graphite fibers wherein the substrate is a member selected from the group consisting of quartz, alumina and oxidized silicon.

5. The process of claim 2 for producing graphite fibers wherein the metal catalyst is a member selected from the group consisting of nickel, cobalt and iron.

6. The process of claim 2 for producing graphite fibers wherein the metal of the organo metal compound is a member selected from the group consisting of nickel, cobalt and iron.

7. The process of claim 2 for producing graphite fibers wherein the metal catalyst is adhered to the substrate by a process which comprises depositing a 1 to 20 nm thick film of catalyst metal on the substrate and heating the substrate and metal film to a temperature of 650° to 850° C. to coalesce and form catalyst metal particles on the substrate and wherein the graphite fibers are generated on said catalyst metal particles.

8. The process of claim 2 for generating graphite fibers wherein the metal catalyst is adhered to the substrate by a process which comprises depositing a film of catalyst metal on the substrate, selectively removing undesired portions of the metal film from the substrate to obtain catalyst metal at desired positions on the substrate and wherein the graphite fibers are generated at said desired positions.

9. The process of claim 2 for generating graphite fibers wherein the metal catalyst is adhered to the substrate by a process which comprises successively depositing a film of catalyst metal on the substrate, depositing a layer of material on the film of catalyst material and selectively removing portions of the layer of material from the film of catalyst metal to obtain catalyst metal at desired positions on the substrate and wherein the graphite fibers are generated at said desired positions.

10. The process of claim 2 for generating graphite fibers wherein the metal catalyst is adhered to the substrate by a process which comprises successively depositing a film of catalyst metal on the substrate, depositing a layer of material on the film of catalyst material and selectively removing portions of the deposited layer and underlying portions of the metal film to expose the substrate and to expose the metal catalyst layer between the substrate and deposited layer and generating graphite fibers at the exposed metal catalyst layer.

11. A process for producing graphite fibers which comprises adhering a carbon catalyst at desired positions on a substrate which process comprises depositing a layer of carbon catalyst material on said substrate, forming a reduced surface area of said layer of carbon catalyst material on said substrate, which reduced area defines areas of the substrate on which it is desired to generate graphite fibers, and generating said graphite fibers at said desired positions by chemical vapor deposition of carbon from an organo metal compound at a temperature of 650° to 850° C.

12. The process of claim 11 for generating graphite fibers wherein the carbon catalyst layer is less than 50 nm thick.

13. The process of claim 11 for generating graphite fibers wherein the substrate is a member selected from the group consisting of quartz, alumina and oxidized silicon.

14. The process of claim 11 for generating graphite fibers wherein an amount of carbon catalyst is adhered to the substrate at desired positions by a process which comprises providing a photo resist resin layer on the surface of the substrate, removing a portion of the photo resist layer to define a desired photo resist pattern, wherein the photo resist pattern defines the areas of the substrate on which it is desired to generate fibers, heating and carbonizing the desired photo resist pattern to adhere carbon in the form of the photo resist pattern on the substrate and wherein the graphite fibers are generated on said carbon pattern.

15. The process of claim 11 for generating graphite fibers wherein the carbon catalyst is adhered to the substrate at desired positions on the substrate by a process which comprises successively depositing a layer of carbon catalyst on the substrate, depositing a layer of material on the layer of carbon catalyst and selectively removing portions of the material from the layer of carbon catalyst to obtain carbon exposed catalyst at desired positions on the substrate and wherein the graphite fibers are generated at said desired positions.

* * * * *